No. 687,681. Patented Nov. 26, 1901.
M. GALLY.
ELECTRICAL APPARATUS.
(Application filed Sept. 9, 1901.)
(No Model.)
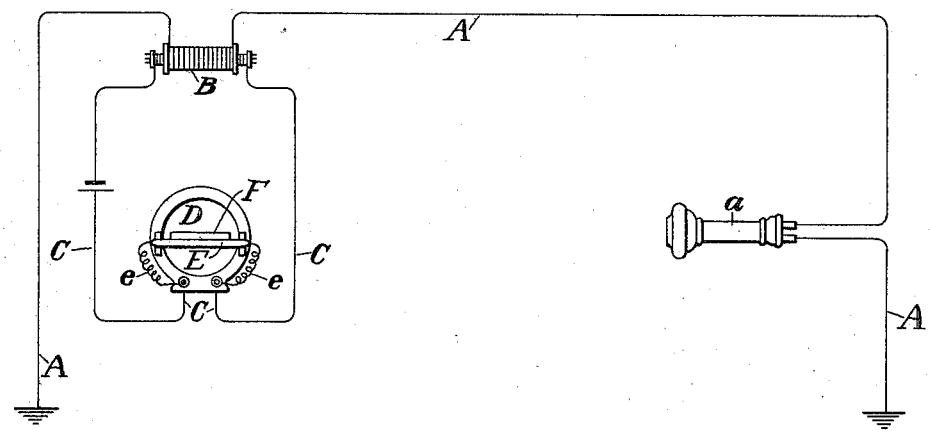
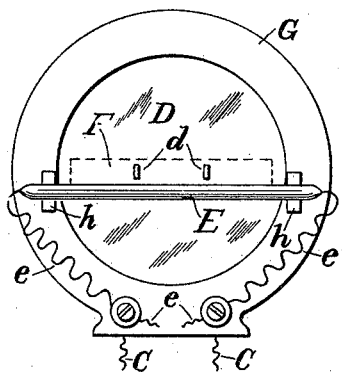
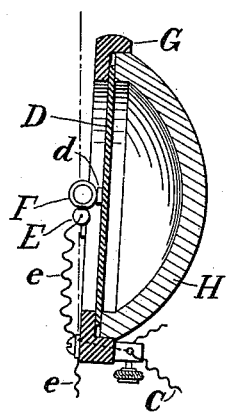
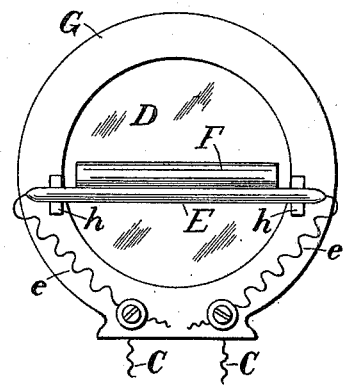
Witnesses:
Bert C. Jones
Robt. A. Gally
Inventor,
M. Gally

UNITED STATES PATENT OFFICE.

MERRITT GALLY, OF BROOKLYN, NEW YORK.

ELECTRICAL APPARATUS.

SPECIFICATION forming part of Letters Patent No. 687,681, dated November 26, 1901.

Application filed September 9, 1901. Serial No. 74,810. (No model.)

*To all whom it may concern:*

Be it known that I, MERRITT GALLY, a citizen of the United States, residing at Brooklyn, in the county of Kings and State of New York, have invented new and useful Improvements in Electrical Apparatus, of which the following is a specification.

My invention relates to devices for producing secondary electrical currents through the medium of an induction-coil and to the application of such devices to electrical apparatus.

The invention consists, first, in the use of an undivided or unbroken primary circuit with battery, with constant and unreversed current, the circuit having therein a section of lower conductivity than the remainder of the circuit, the circuit-section having a conductor of higher conductivity applied thereto, and means for changing the relative effect of the high conductor on the circuit-section for producing an induced electrical current in the secondary circuit of an induction-coil.

The invention consists, second, in the application of the above-mentioned devices to a telephonic microphone or transmitter.

Figure 1 of the drawings represents a telephonic main line in which are a receiver and an induction-coil, a primary circuit, and battery, in which primary circuit is a telephonic transmitter. Fig. 2 shows the face of the transmitter enlarged with operating circuit-section crossing it. Fig. 3 is a transverse sectional view of the transmitter, showing all the operating parts; and Fig. 4 is a face view of the transmitter with circuit-section crossing it and the operating-conductor applied thereto.

It is generally understood that to produce an induced electrical current in the secondary circuit from an induction-coil a primary circuit with battery or electrical generator must be used with an alternating current or with an unreversed current in a divided circuit, the terminals or electrodes at the circuit-division being caused to successively make and break connection or being in constant "touch" to make greater or lesser pressure one against the other. The latter method is that which is successfully used in connection with telephonic transmitters.

In my experiments in the production of induced electric currents I have discovered that none of the methods above spoken of are necessary, but that an undivided primary circuit may be used without alternating or reversed currents and that no division of circuit or terminals is necessary.

In the unbroken primary circuit C, Figs. 1 and 2, passing through connecting-wires *e e*, I place a circuit-section E, which is made of material of less conductivity than the remainder of the circuit, and has passing through it a constant undiminished flow of electricity. Against this circuit-section, as shown in Figs. 3 and 4, I place a piece of material F of higher conductivity than the circuit-section. It is shown somewhat shorter than the circuit-section E. It may be longer than the circuit-section and be as fully operative. This conducting-piece can be of any convenient shape or a simple bar or plate lying along the face of the circuit-section, as shown in the drawings. When the circuit-section and operating-conductor lie quietly together, there is a combined conductivity to accommodate the flow of current from the battery through the circuit. When the circuit-section or the operating-conductor, either or both, have any movement so that their faces slide in the least one upon the other, a change is made in the conductivity of the circuit and a corresponding current is produced in the secondary of the induction-coil. They may be caused to strike together and a corresponding secondary current produced; but this is not necessary, as no differences of pressure are required. In fact a simple sliding motion gives the best results.

In Fig. 3 of the drawings the sides of the circuit-section E and the operating-conductor F, which lie together, are shown as flattened to secure the preferable "slide." In the figures of the drawings the circuit-section is shown as connected to the frame G of a telephonic transmitter. Upon the diaphragm D are two small supports *d*, upon which the operating-conductor rests to prevent it from damping the vibrations of the diaphragm and through which the motions of the diaphragm are conveyed to the operating-conductor. This construction shows the application of the invention to a telephonic transmitter. For simply producing a secondary current in the induction-coil any convenient mechanism can be used for giving necessary motions to the operating-conductor or to the circuit-section.

What I claim as my invention, and desire to secure by Letters Patent, is—

1. An electrical induction-coil having a continuous undivided or unbroken primary circuit with battery, passing a constant, unbroken and unreversed current; the circuit having therein a section constructed of rigid material or held rigidly and of lower conductivity than the remainder of the circuit, and means applied to said circuit-section for producing an electric current in the secondary circuit of the induction-coil.

2. In a continuous undivided or unbroken primary circuit of an electrical induction-coil, a circuit-section constructed of rigid material or held rigidly and of lower conductivity than the remainder of the circuit, and the operating-conductor, substantially as described, applied to said circuit-section, for producing an electric current in the secondary circuit of the induction-coil.

3. A continuous undivided or unbroken primary circuit of an electrical induction-coil, the circuit having a battery therein, producing a constant unreversible current; a section of said circuit constructed of rigid material or held rigidly, of lower conductivity than the remainder of the circuit; and an operating-conductor substantially as described, applied to said circuit-section; and a telephonic diaphragm for producing undulating movements of the operating-conductor or the circuit-section, either or both, to produce a corresponding undulating electric current in the secondary circuit of the induction-coil.

4. In a telephonic transmitter or microphone, an electric conductor of low conductivity crossing the diaphragm, and adapted to be connected with an electric circuit as a section thereof; a conductor of high conductivity applied to and lying along the low conductor; and a vibrating diaphragm for receiving vibrations of speech, and transmitting them to one of said conductors.

5. A telephonic transmitter, or microphone, having an electric conductor crossing the vibrating diaphragm in proximity with but not attached thereto, the conductor constructed and arranged to be connected with the two terminals of an electric circuit, and to receive a second detached conductor against its face.

MERRITT GALLY.

Witnesses:
G. POTTER,
LOUIS SCHEUER.